United States Patent [19]

Albizzati et al.

[11] Patent Number: 5,122,492
[45] Date of Patent: * Jun. 16, 1992

[54] COMPONENTS AND CATALYSTS FOR THE POLYMERIZATION OF OLEFINS

[75] Inventors: Enrico Albizzati, Novara; Giampiero Morini, Pavia; Umberto Giannini, Milan, all of Italy

[73] Assignee: Himont Incorporated, Wilmington, Del.

[*] Notice: The portion of the term of this patent subsequent to Nov. 20, 2007 has been disclaimed.

[21] Appl. No.: 628,526

[22] Filed: Dec. 14, 1990

[30] Foreign Application Priority Data

Dec. 22, 1989 [IT] Italy ................. 22826 A/89

[51] Int. Cl.⁵ ............................................. C08F 4/646
[52] U.S. Cl. ................................ 502/120; 502/126; 526/125
[58] Field of Search ......................... 502/120, 126

[56] References Cited

U.S. PATENT DOCUMENTS

| 4,522,930 | 6/1985 | Aubizzati et al. | 502/126 X |
| 4,970,184 | 11/1990 | Schauss et al. | 502/126 X |
| 4,971,937 | 11/1990 | Aubizzati et al. | 502/126 |

FOREIGN PATENT DOCUMENTS

| 0361494 | 4/1989 | European Pat. Off. |
| 966025 | 6/1964 | United Kingdom |
| 02446 | 7/1989 | World Int. Prop. O. |

Primary Examiner—Patrick P. Garvin

[57] ABSTRACT

Catalyst components for the polymerization of olefins and catalysts obtained therefrom, said components comprising a porous metal oxide on which a magnesium dihalide, and a titanium halide or titanium halogen alcoholate and a compound containing two or more ether groups having specific reactivity properties towards $MgCl_2$ and $TiCl_4$ are supported.

10 Claims, No Drawings

COMPONENTS AND CATALYSTS FOR THE POLYMERIZATION OF OLEFINS

The present invention relates to catalyst components for the polymerization of olefins and catalysts obtained therefrom.

In U.S. Ser. No. 413,410, filed on Sep. 27, 1989, and now U.S. Pat. No. 4,971,937 of the Applicant catalyst components for the polymerization of olefins have been described, said components being obtained by supporting on an anhydrous magnesium halide, in active form, a titanium halide and an electron donor compound selected from compounds containing two or more ether groups, having specific reactivity properties towards magnesium chloride and titanium tetrachloride. Typical ethers are represented by the formula:

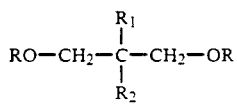

where R, $R_1$ and $R_2$ are the same or different from each other and are hydrocarbyl radicals, and $R_1$ and $R_2$ can also be hydrogen.

Now it has been found that is possible to prepare highly active and stereospecific catalysts for the polymerization of olefins starting from solid catalyst components obtained by reacting a titanium halide or titanium halogen alcoholate and an electron donor compound, selected from compounds with two or more ether groups as described in U.S. Ser. No. 413,410, filed on Sep. 27, 1989, and now U.S. Pat. No. 4,971,937 with the solid obtained by impregnating a porous metal oxide, such as silica or alumina, or mixtures thereof with a solution of magnesium dihalide or of a magnesium compound which can be transformed into a dihalide through a reaction with halogenating agents.

Surprisingly, the catalysts of the invention are much more active and stereospecific than the catalysts supported on metal oxides and obtained from electron-donor compounds other than the ether compounds used in the catalysts of the invention.

More specifically, the catalyst components of the invention comprise a porous metal oxide on which a magnesium dihalide and a titanium halide or titanium halogen alcoholate and an electron-donor compound containing two or more ether groups are supported, said electron-donor compound being capable of complexing with anhydrous magnesium dichloride in a quantity not greater than 60 mmoles per 100 g of $MgCl_2$ and being unreactive with $TiCl_4$ to give substitution reactions, or being capable of reacting in this manner for less than 50% in moles.

By titanium and magnesium compounds and for electron-donors compounds supported on porous metal oxide it is meant those compounds which are physically fixed on the oxide and/or chemically combined with the oxide; possibly the titanium and magnesium compounds and the electron-donors, which are supported on the porous metal oxide, may also be chemically combined with each other.

In the supported components the Mg/Ti molar ratio is from 0.5:1 to 10:1, in particular from 4:1 to 6:1, and the molar ratio Ti/electron-donor compound is from 0.5:1 to 3:1. The metal oxide is present in quantities greater than 40% by weight with respect to the total weight of the component.

The metal oxides have a porosity greater than 0.3 cc/g, preferably from 1 to 3 cc/g. The surface area is greater than 30 $m^2/g$ (BET) and in particular greater than 100 $m^2/g$.

The preferred oxides such as silica and alumina, have in general a surface area from 100 to 400 $m^2/g$.

The metal oxides generally contain hydroxyl surface groups (e.g. in an amount of from 1 to 5 mmoles/g of oxide), but may also have none of them. Preferably the oxides are used in the anhydrous state, i.e., free from chemically uncombined water. Chemically uncombined water, however, can be present in a quantity smaller than 30 mmoles/g of oxide. Said water can be removed by submitting the oxides to heating at temperatures from 150° to 250° C. The amount of hydroxyl groups is controlled by calcining the oxides at temperatures usually from 250° C. to 900° C (the higher the temperature the smaller the number of hydroxyls present).

Different methods are used for the preparation of the catalyst component. The preferred method consists in impregnating the metal oxide by suspending it 1) in a solution of magnesium chloride in an organic solvent, such as an alcohol or an ether, or 2) in a hydrocarbon solution (hexane, heptane) of a $MgCl_2.nTi(OR)_4$ complex where n is a number from 1 to 3, and R is an $C_{2-8}$ alkyl, $C_{3-8}$ cycloalkyl or $C_{6-8}$ aryl radical and then evaporating the solvent. The oxide thus obtained is then reacted with an excess of $TiCl_4$ containing an ether compound in solution at temperatures from 60° to 135° C. The solid is separated hot from the excess of $TiCl_4$ and then washed thoroughly with hexane or heptane until there are no chlorine ions in the wash. The treatment with $TiCl_4$ may be repeated.

It is also possible to react a magnesium impregnated metal oxide, first with the ether compound and then with the titanium tetrachloride.

The ether compound can also be added during the impregnation of the metal oxide, or can be reacted after the reaction with the titanium compound. In this case, it is best to conduct the reaction in the presence of an aromatic solvent, such as benzene and toluene.

When the metal oxides are used with magnesium compound solutions other than magnesium halides, it is best to convert said compounds into halides by reacting them with halogenating agents, such as $SiCl_4$, Al-alkyl halides, and $Cl_3SiR$.

The oxide thus impregnated and treated is then reacted with $TiCl_4$ and with the ether compound following the methods indicated above.

Suitable magnesium compounds which are other than the magnesium halides include $RMgX$, $MgR_2$, $Mg(OR)_2$, $XMgOR$, $MgX_2nTi(OR)_4$ where X is Cl or Br, R is a C1-18 alkyl or $C_{3-18}$ cycloalkyl radical, and n is from 1 to 4.

Preferred ether compounds have the following general formula:

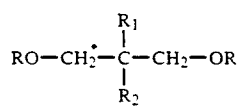

where R, $R_1$ and $R_2$ are the same or different from each other and are $C_{1-18}$ alkyl, $C_{3-18}$ cycloalkyl, $C_{6-18}$ aryl, and $C_{7-18}$ aralkyl or alkaryl radicals and $R_1$ and $R_2$ can also be hydrogen atoms.

In particular, R is a $C_{1-6}$ carbon alkyl radical, and preferably a methyl. Moreover, when $R_1$ is methyl, ethyl, propyl or isopropyl, $R_2$ can be ethyl, propyl, isopropyl, butyl, isobutyl, t-butyl, 2-ethylhexyl, cyclohexyl, methylcyclohexyl, phenyl or benzyl; when $R_1$ is hydrogen, $R_2$ can be ethyl, butyl, sec-butyl, tert-butyl, 2-ethylhexyl, cyclohexylethyl, diphenylmethyl, p-chlorophenyl, 1-naphthyl or 1-decahydronaphthyl; $R_1$ and $R_2$ can also be the same and are ethyl, propyl, isopropyl, butyl, isobutyl, t-butyl, neopentyl, phenyl, benzyl or cyclohexyl.

Representative examples of the ethers included in the formula indicated above are: 2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-diethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(p-fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-(2-ethylhexyl)-1,3-dimethoxypropane, 2,2-bis(2-ethylhexyl)-1,3-diethoxypropane, 2,2-bis(p-methylphenyl)-1,3-dimethoxypropane, 2-methyl-2-isopropyl-1,3-diethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-sec-butyl-1,3-dimethoxypropane, 2,2-di-tert-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane.

Preferably, these ethers form complexes with magnesium dichloride in quantities equal to 20-50 mmoles per 100 g of $MgCl_2$ and react with $TiCl_4$ for less than 30% in moles.

Other ethers that can be used are: 2,3-diphenyl-1,4-diethoxybutane, 2,3-dicyclohexyl-1,4-diethoxybutane, 2,3-dibenzyl-1,4-diethoxybutane, 2,3-dibenzyl-1,4-dimethoxybutane, 2,3-dicyclohexyl-1,4-dimethoxybutane, 2,3-diisopropyl-1,4-dimethoxybutane, 2,3-diisopropyl-1,4-diethoxybutane, 2,2-bis(p-methylphenyl)-1,4-dimethoxybutane, 2,3-bis(p-chlorophenyl)-1,4-dimethoxybutane, 2,3-bis(p-fluorophenyl)-1,4-dimethoxybutane, 2,4-diphenyl-1,5-dimethoxypentane, 2,5-diphenyl-1,6-dimethoxyhexane, 2,4-diisopropyl-1,5-dimethoxypentane, 2,5-diphenyl-1,6-dimethoxyhexane, 3-methoxymethyltetrahydrofuran, 3-methoxymethyldioxane, 1,1-dimethoxymethyl-1,2,3,4-tetrahydronaphthalene, 1,1-dimethoxymethyl-decahydronaphthalene, 1,1-dimethoxymethylindane, 2,2-dimethoxymethylindane, 1,1-dimethoxymethyl-2-isopropyl-5-methylcyclohexane, 1,3-diisobutoxypropane, 1,2-diisobutoxyethane, 1,3-diisoamyloxypropane, 1,2-diisoamyloxyethane, 1,3-dineopentoxypropane, 1,2-dineopentoxyethane, 2,2-tetramethylene-1,3-dimethoxypropane, 2,2-pentamethylene-1,3-dimethoxypropane, 2,2-hexamethylene-1,3-dimethoxypropane, 1,2-bis(methoxymethyl)cyclohexane, 2,8-dioxaspiro[5,5]undecane, 3,7-dioxabicyclo[3,3,1]nonane, 3,7-dioxabicyclo[3,3,0]octane, 3,3-diisobutyl-1,5-dioxane, 6,6-diisobutyldioxepane, 1,1-dimethoxymethylcyclopropane, 1,1-bis(methoxymethyl)cyclohexane, 1,1-bis(methoxymethyl)bicyclo[2,2,1]heptane, bis(methoxymethyl)bicyclo[2,2,1]heptane, 1,1-dimethoxymethylcyclopentane, 2-methyl-2-methoxymethyl-1,3-dimethoxypropane.

Particularly preferred ethers are the 1,3-diethers where R is methyl and $R_1$ and $R_2$, are the same or different from each other and are isopropyl, isobutyl, tert-butyl, cyclohexyl, isopentyl, cyclohexylethyl. Particularly preferred ethers are 2,2-diisobutyl-1,3-dimethoxypropane; 2-isopropyl-2-isopentyl-1,3-dimethoxypropane; 2,2-bis(2-cyclohexylmethyl)-1,3-dimethoxypropane.

The complexing test of the ethers with $MgCl_2$ is carried out as follows:

In a 100 ml glass flask equipped with a mechanical agitator having fixed blades are introduced in nitrogen atmosphere in order:

70 ml of anhydrous n-heptane 12 mmoles of anhydrous $MgCl_2$ activated as described below 2 mmoles of ether.

The mixture is reacted at 60° C. for 4 hours (agitator speed 400 rpm). It is then filtered and washed at room temperature with 100 ml of n-heptane and dried with a mechanical pump.

The solid is characterized, after having been treated with 100 ml of ethanol, by gas chromatographic quantitative analysis for the analysis of the quantity of ether fixed.

The test of the reactivity with $TiCl_4$ is carried out as follows:

In a 25 ml test-tube with a magnetic agitator in nitrogen atmosphere are introduced in order:

10 ml of anhydrous n-heptane 5 mmoles of $TiCl_4$ 1 mmole of donor

The mixture is reacted at 70° C. for 30 minutes, then cooled to 25° C. and decomposed with 90 ml of ethanol.

The solutions obtained are analyzed by gas chromatography, by using the standard internal method, with an HRGC Mega Series Carlo Erba gas chromatograph with a 25 meter Chrompack CP-SIL capillary column.

The magnesium chloride used in the complexing test with the ethers is prepared as follows.

In a 1 liter vibrating mill jar (Vibratrom from Siebtechnik) containing 1.8 Kg of steel spheres of 16 mm diameter, 50 g of anhydrous $MgCl_2$ and 6.8 ml of 1,2-dichloroethane (DCE) are introduced in nitrogen atmosphere.

It is ground at room temperature for 96 hours, there after the solid recovered is kept under vacuum in the mechanical pump for 16 hours at 50° C.

Characterization of the solid:
Half peak breadth of the reflection D110=1.15 cm
Presence of a halo with maximum intensity at angle 2°=32.1°
Surface area (B.E.T.)=125 m²/g
DCE residue=2.5% by weight.

The catalyst components of the present invention form, with Al-alkyl compounds, catalysts for the polymerization of $CH_2=CHR$ olefins, where R is hydrogen, or a 1-6 carbon alkyl radical, or an aryl.

In case of the stereoregular polymerization of olefins, particularly propylene, it may be advantageous in some cases to use, together with the Al-alkyls, also an electron-donor compound selected among 2,2,6,6-tetramethylpiperidine and silicon compounds containing at least one Si-OR link where R is a hydrocarbyl radical.

Preferably the silicon compounds have the formula $$R^I R^{II} Si(OR^{III}) OR^{IV}$$

where $R^I$ and $R^{II}$, are the same or different from each other and are branched $C_3$ to $C_{12}$ alkyl radicals, or $C_3$–$C_{12}$ cycloaliphatic radicals, or 6–12 carbon aryls; $R^{III}$ and $R^{IV}$, independently, are 1–6 carbon alkyl radicals.

Examples of said representative compounds are: (tert-butyl)$_2$Si(OCH$_3$)$_2$; (cyclohexyl)$_2$ Si(OCH$_3$)$_2$; (cyclopentyl)$_2$ Si(OCH$_3$)$_2$; (isopropyl)$_2$ Si(OCH$_3$)$_2$; (sec-butyl)$_2$ Si(OCH$_3$)$_2$.

Other examples of silicon compounds are phenyltriethoxysilane, ethyltriethoxysilane, propyltriethoxysilane, chloroethyltriethoxysilane, chlorophenyltriethoxysilane, neopentyltriethoxysilane, octyl trimethoxysilane, isopropyl-triethoxysilane, n-butyltriethoxysilane, n-octyl-trimethoxysilane.

The Al-alkyl compounds comprise the Al-trialkyl compounds, such as Al-triethyl, Al-triisobutyl, Al-tri-n-butyl. Linear or cyclic Al-alkyls containing 2 or more Al atoms linked to each other by O, N, S atoms may also be used.

Examples of these compounds are:

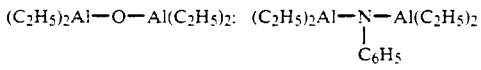

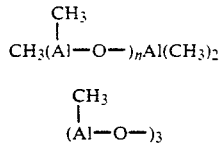

where n is a number from 1 to 20.

The Al-alkyl compound is used in Al/Ti molar ratios usually of from 1 to 1000.

Al-Alkyl compounds can be used in mixture with Al-alkyl halides such as AlEt$_2$Cl.

The molar ratio between the Al-alkyl compound and the electron-donor compound added to the Al-alkyl compound is usually from 5:1 to 100:1.

As indicated, the catalysts are suitable for the (co)-polymerization of $CH_2=CHR$ olefins where R has the above indicated meaning, and in particular for the homo- and copolymerization of propylene to form isotactic polypropylene, crystalline copolymers of the propylene with minor proportions of ethylene, and optionally butene, and similar higher alpha-olefins, or impact grade polypropylene obtained by polymerization of the propylene, alone or with ethylene and/or another alpha-olefin followed by at least another polymerization step in which an olefin elastomeric polymer is formed. The catalysts can be used in the preparation of HDPE, LLDPE, and elastomeric ethylene-propylene copolymers containing optionally minor proportions of a diene (e.g. EP and EPDM rubbers).

The polymerization of olefins is carried out according to known methods operating in liquid phase formed by the monomer, or monomers, or by their solutions in hydrocarbon solvents, such as hexane and heptane, or in gas phase, or with mixed liquid-gas techniques.

The polymerization temperature is generally from 0° to 150° C., preferably from 60° to 100° C., and is carried out at atmospheric pressure or higher.

The catalysts can be precontacted with small quantities of olefin (prepolymerization) in order to improve the catalytic activity and/or morphology of the polymer.

The prepolymerization is carried out maintaining the catalyst in suspension in a hydrocarbon medium (hexane, heptane, etc.) and allowing small quantities of monomer to go through, maintaining the temperature from room temperature to 60° C., until a quantity of polymer is produced which is between 0.5 and 3 times the weight of the solid catalyst component. The prepolymerization can also take place in liquid monomer, or in gas phase, under the temperature conditions mentioned above, thus producing quantities of polymer up to 1000 times the weight of the solid catalyst component.

The following examples are given to illustrate the invention.

EXAMPLES 1 to 9

Preparation of the said catalyst component 15 g of silica (Grace 952) calcined at 150° C. for 8 hrs are treated with 90 ml of (CH$_3$)$_3$SiCl in reflux for 16 hrs. It is filtered and washed with anhydrous n-heptane at 60° C. until all traces of (CH$_3$)$_3$SiCl are eliminated, then dried by a mechanical pump.

30 g of alumina (Ketjen grade B) are calcined under vacuum at 150° C. for 6 hrs. The silica and alumina thus treated are supported with the Mg compound according to the Methods set forth below.

Method A 3.8 g of pre-treated silica are suspended in inert atmosphere in 20 ml of anhydrous n-heptane. Then 17.5 mmoles of MgCl$_2$.2.2 Ti(OBu)$_4$ prepared by dissolving a suitable quantity of MgCl$_2$ in Ti(OBu)$_4$ at 140° C. per 4 hrs, are added. The mixture is reacted for 4 hrs at 90° C. in a rotavapor flask and then the solvent is evaporated under vacuum.

Method B 4 g of pre-treated silica are suspended in 30 ml of anhydrous ethanol containing 18 mmoles of MgCl$_2$. The mixture is reacted for 4 hrs at 70° C. in a rotavapor flask and then the ethanol is evaporated until a residual content of 3 moles of ethanol per mole of MgCl$_2$ is reached.

Method C 4 g of pre-treated silica are suspended in 30 ml of anhydrous hexane containing 18 mmoles of Mg(n-hexyl)$_2$. The mixture is reacted for 4 hrs at 70° C. in a rotavapor flask, then the hexane is evaporated. The solid thus obtained is treated with 50 ml of SiCl$_4$ in reflux for 4 hrs, then filtered, washed with hexane and vacuum dried.

Method D 4 g of pre-treated alumina are suspended, in inert atmosphere, in 20 ml of anhydrous n-heptane and then 18 mmoles of MgCl$_2$0$_2$.2Ti(OBu)$_4$ are added. The mixture is reacted for 4 hrs at 70° C. in a rotavapor flask and then the solvent is evaporated under vacuum.

Reaction with TiCl$_4$

The silica (methods A, B, C,) and the alumina (method D) supported with the Mg compound are added in inert atmosphere, slowly, under agitation and at room temperature, to 200 ml of TiCl$_4$, then 5.85 mmoles of a compound containing ether groups are added. The mixture is heated to 100° C., reacted at this temperature for 2 hrs and then filtered.

Another 200 ml of TiCl$_4$ are added, and the treatment is repeated at 100° C. for 2 hrs; at the end it is filtered and washed with anhydrous n-heptane twice at 60° C., and 3 times at room temperature. The washing treatment has been carried out until no chlorine ions were detectable in the wash. The ether compounds used and the composition of the catalyst components are shown in Table 1.

EXAMPLES 10 to 18

Propylene polymerization

Method 1

In a 2000 ml stainless steel autoclave with an anchor agitator, 1000 ml of n-heptane, 2.5 mmoles of Al(C$_2$H$_5$)$_3$ and an adequate quantity of the solid catalyst component are introduced in propylene gas current at 20° C. The autoclave is closed after having brought the pressure to 1 atm by feeding propylene, and a hydrogen overpressure equal to 0.2 atm is introduced.

The mixture is heated 70° C. and the total pressure is brought to 7 atm with propylene. It is polymerized for 2 hours while the monomer is fed continuously, and the temperature is maintained at 70° C.

The polymer obtained is then isolated by filtration and dried. The polymer remaining in the filtered product is precipitated with methanol, vacuum dried and considered in determining the total residue of the n-heptane extraction.

The polymerization results and the properties of the polymers obtained are shown in Table 2.

Method 2

In the autoclave described in method 1,20 ml of a heptane suspension containing an adequate quantity of the solid catalyst component, 5 mmoles of Al(C$_2$H$_5$)$_3$, 800 ml of hydrogen, and 500 g of propylene are introduced at 20° C. under vacuum, and then heated to 70° C. and polymerized for two hours. The polymer obtained is dried and characterized.

The polymerization yields and properties of the polymers obtained are shown in Table 2.

TABLE 1

| Ex. | Ether compound | Synthesis method | Composition (% weight) catalyst component Mg | Ti | Donor |
|---|---|---|---|---|---|
| 1 | 2,2-diisobutyl-1,3-dimethoxypropane | A | 4.7 | 1.9 | 9.3 |
| 2 | 2-isopropyl-2-isopentyl 1,3-dimethoxypropane | A | 4.4 | 1.5 | 9.2 |
| 3 | 2,2-di-n-propyl-1,3-dimethoxypropane | A | 4.1 | 1.3 | 11.5 |
| 4 | 2-ethyl-2-butyl-1,3-dimethoxypropane | A | 4.2 | 2.0 | 9.1 |
| 5 | 2,2-diisopentyl-1,3-dimethoxypropane | A | 4.3 | 1.8 | 10.1 |
| 6 | 2,2-dicyclohexyl-1,3-dimethoxypropane | A | 4.5 | 2.2 | 10.4 |
| 7 | 2-isopropyl-2-isopentyl 1,3-dimethoxypropane | B | 5.5 | 1.9 | 6.1 |
| 8 | 2-isopropyl-2-isopentyl-1,3-dimethoxypropane | C | 5.1 | 2.3 | 5.2 |
| 9 | 2-isopropyl-2-isopentyl-1,3-dimethoxypropane | D | 3.6 | 2.4 | 6.7 |

TABLE 2

| Ex. No. | Method No. | Cat. Ex. No. (amount) mg. | Yield gPP/gCat | I.I. % | I.V. dl/g | Bulk density g/ml |
|---|---|---|---|---|---|---|
| 10 | 1 | 1 (60) | 2800 | 95.3 | 1.71 | 0.42 |
| 11 | 1 | 2 (55) | 3000 | 98.5 | 1.82 | 0.41 |
| 12 | 1 | 3 (58) | 3400 | 95.0 | 1.94 | 0.41 |
| 13 | 1 | 4 (62) | 2500 | 91.0 | 1.87 | 0.42 |
| 14 | 1 | 5 (50) | 4100 | 96.1 | 1.90 | 0.41 |
| 15 | 1 | 6 (51) | 4300 | 95.7 | 1.78 | 0.42 |
| 16 | 1 | 7 (58) | 3700 | 94.2 | 1.80 | 0.42 |
| 17 | 1 | 8 (60) | 2600 | 93.4 | 1.84 | 0.40 |
| 18 | 2 | 9 (12) | 14000 | 97.0 | 1.42 | 0.41 |

EXAMPLE 19

Ethylene polymerization

In a 2000 ml stainless steel autoclave with an anchor agitator, a suspension containing in 1000 ml of n-heptane, 2.5 mmoles of Al(C$_2$H$_5$)$_3$ and 25 mg of the solid catalyst component of example 2 are introduced under vacuum at 65° C. Then 4.5 atm of hydrogen and ethylene are introduced until a total pressure of 11.5 atm is reached. The mixture is polymerized at 75° C. for 3 hours while continuing to feed the monomer. After filtration and drying, 125 g of polyethylene with an intrinsic viscosity of 1.8 dl/g and bulk density of 0.41 g/ml are isolated.

EXAMPLE 20

Propylene/ethylene polymerization

In the autoclave described in example 17 are introduced under vacuum at 20° C.:
500 g of propylene
5 mmoles of Al(iso-C$_4$H$_9$)$_3$
an ethylene overpressure equal to 3.5 atm
A heptane suspension containing 30 mg of the catalytic component of ex. 2 is injected under argon pressure. It is then polymerized at 20° C. while continuing to feed the ethylene for 1 hour. After having removed the unreacted monomers, 75 g of polymer are obtained (40% propylene, 4% crystallinity under X-rays).

We claim:

1. A catalyst component for the polymerization of olefins comprising a porous metal oxide, on which a magnesium dihalide and a titanium halide or titanium halogen alcoholate, and an electron-donor compound containing two or more ether groups are supported, said electron-donor compound being capable of complexing with anhydrous magnesium dichloride in a quantity not greater than 60 mmoles per 100 g of $MgCl_2$ and being unreactive with $TiCl_4$ to give substitution reactions, or being capable of reacting in this manner for less than 50% in moles.

2. The catalyst component of claim 1, where the titanium halide is tetrachloride, the magnesium dihalide is dichloride and the Mg/Ti molar ratio is from 0.5:1 to 10:1, the Ti/electron donor compound molar ratio is from 0.5:1 to 3:1, and the metal oxide is present in a quantity greater than 40% by weight with respect to the total weight of the component.

3. The catalyst component of claim 1, where the metal oxide is selected from the group consisting of silica, alumina, and mixtures thereof.

4. The catalyst component of claim where the compound containing ether groups is selected from compounds having the general formula

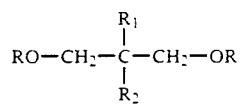

where R, $R_1$ and $R_2$, are the same or different from each other and are $C_{1-18}$ alkyl, $C_{3-18}$ cycloalkyl, $C_{6-18}$ aryl, $C_{7-18}$ aralkyl or alkylaryl radicals, and $R_1$ and $R_2$ can also be hydrogen atoms.

5. The catalyst component of claim 4, where R is methyl, and $R_1$ and $R_2$, are the same or different from each other and are selected from the group consisting of methyl, ethyl, propyl, isopropyl, butyl, isobutyl, tert-butyl, iso-pentyl, 2-ethylhexyl, cyclohexyl, methylcyclohexyl, phenyl, and benzyl, and when $R_1$ is hydrogen, $R_2$ is ethyl, butyl, sec.butyl, tert-butyl, 2-ethylhexyl, cyclohexyl, diphenylmethyl, p-chlorophenyl, 1-naphthyl, or 1-decahydronaphthyl.

6. The catalyst component of claim 4 where the compound containing ether groups compound is selected from the group consisting of 2,2-diisobutyl-1,3-dimethoxypropane, 2-isopropyl-2-isopentyl-1,3-dimethoxypropane, 2,2-di-n-propyl-1,3-dimethoxypropane, 2,2-diisopentyl-1,3-dimethoxypropane and 2,2-dicyolohexyl-1,3-dimethoxypropane.

7. A catalyst for the polymerization of olefins comprising the reaction product of the catalyst component of claim 1 and an Al-alkyl compound.

8. A catalyst for the polymerization of olefins comprising the reaction product of the catalyst component of claim 3 and an Al-alkyl compound.

9. A catalyst for the polymerization of olefins comprising the reaction product of the catalyst component of claim 5 and an Al-trialkyl compound.

10. A catalyst for the polymerization of olefins comprising the reaction product of the catalyst component of claim 6 and an Al-trialkyl compound.

* * * * *